July 30, 1929. P. J. SIMMEN Re. 17,384
AUTOMATIC TRAIN CONTROL
Original Filed Dec. 28, 1922 2 Sheets-Sheet 1
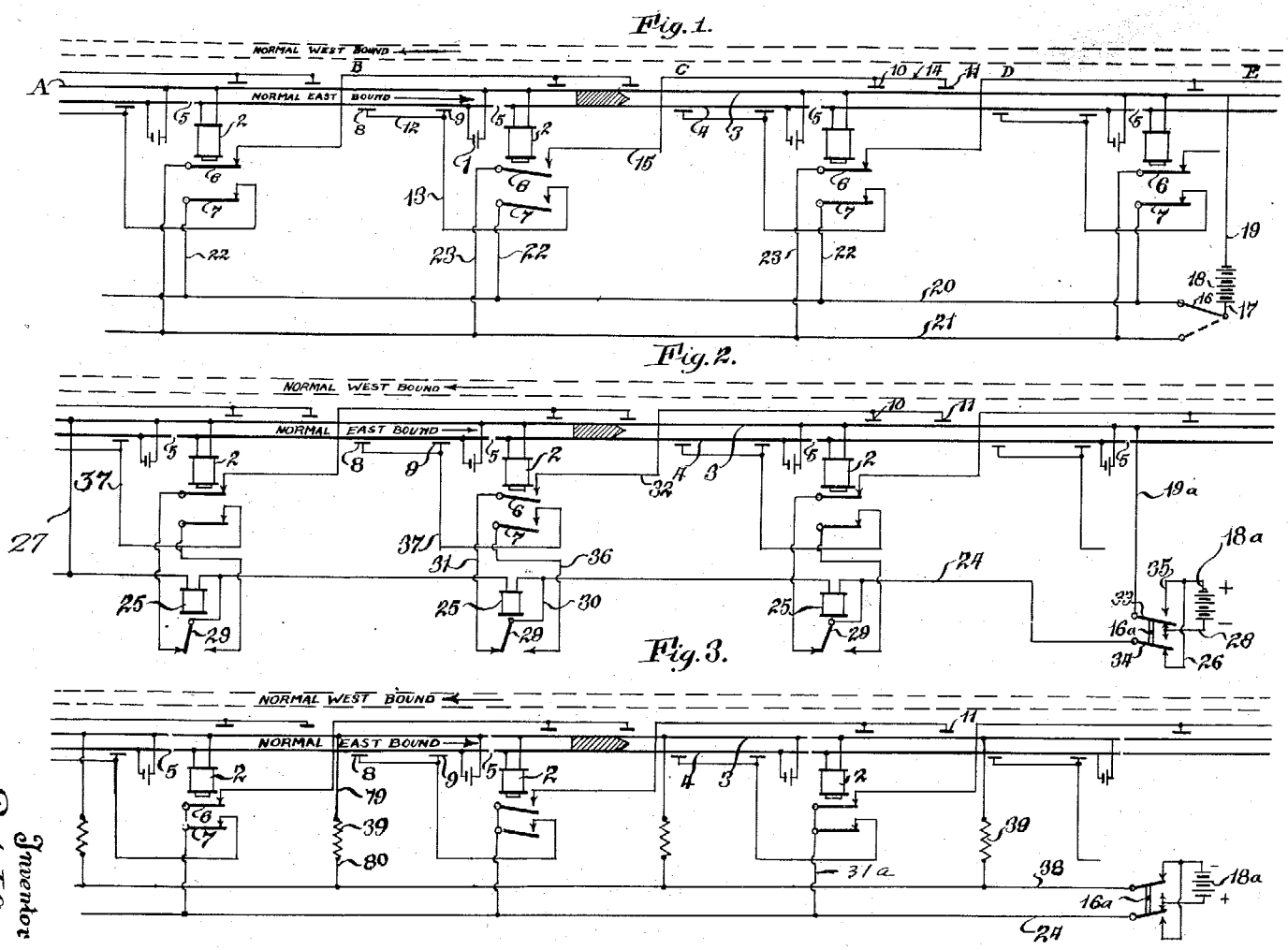
Inventor
Paul J. Simmen
By Poppard Powers
Attorneys July 30, 1929. P. J. SIMMEN Re. 17,384
AUTOMATIC TRAIN CONTROL
Original Filed Dec. 28, 1922 2 Sheets-Sheet 2
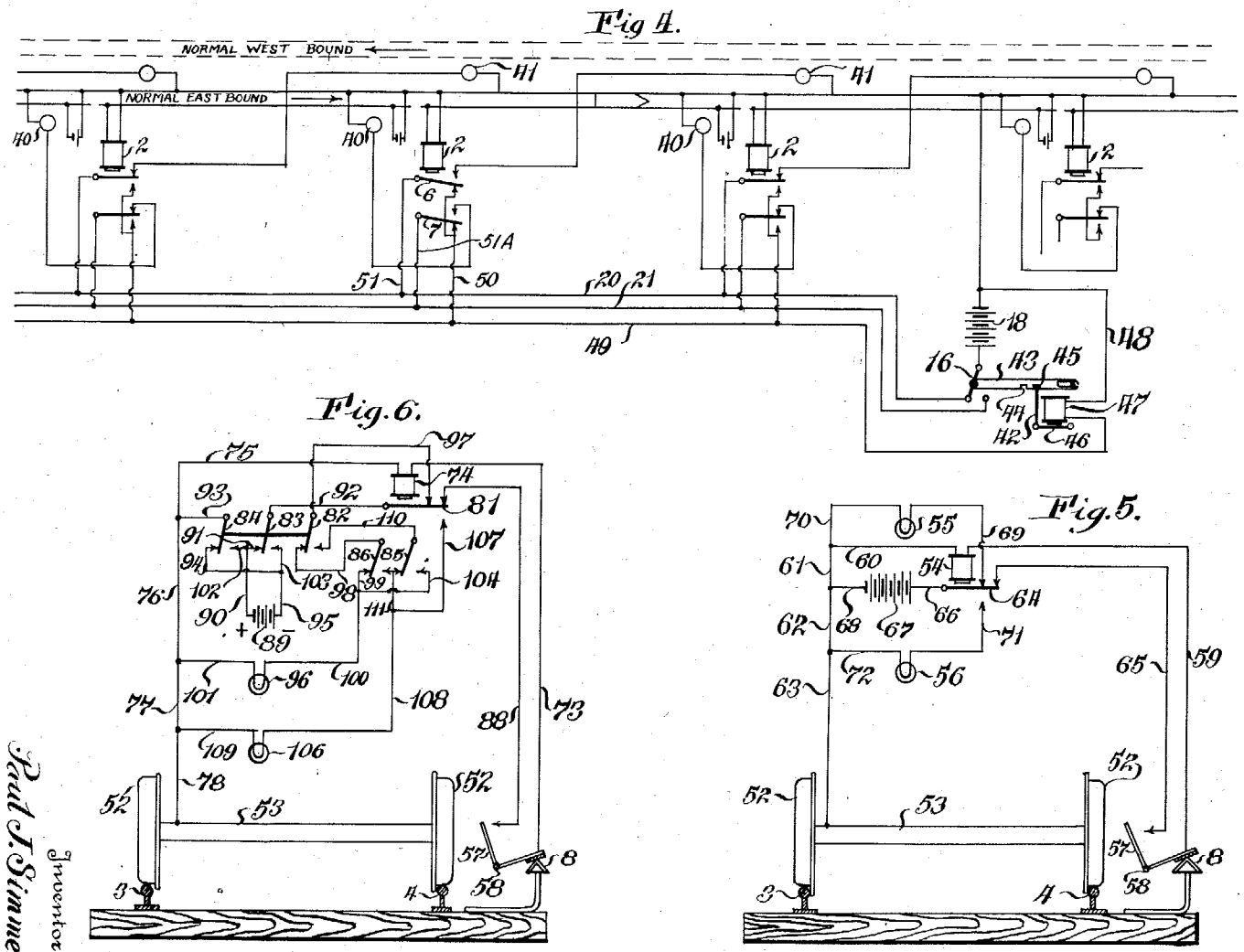
Inventor
Paul J. Simmen
By Popp and Powers,
Attorney Reissued July 30, 1929. Re. 17,384

UNITED STATES PATENT OFFICE.

PAUL J. SIMMEN, OF EDEN, NEW YORK.

AUTOMATIC TRAIN CONTROL.

Original application filed December 28, 1922, Serial No. 609,388. Continued and application filed March 12, 1923, Serial No. 624,351. Original No. 1,592,469, dated July 13, 1926. Application for reissue filed October 27, 1927. Serial No. 229,234.

This invention relates to a system of controlling trains on railway tracks, particularly to a system suitable for a single track railway, wherein trains are operated in both directions, or the substantial equivalent thereof, such as a railway having a track normally used for trains running in one direction and another track normally used for trains running in the other direction, but which tracks it is desirable to use at certain times for trains running in a direction opposite to the normal running.

Traffic conditions on railways have reached the point where it is often desirable to operate trains in a direction opposite to the normal direction of traffic; for instance, where a railway has two tracks, one normally used for east-bound traffic and one normally used for west-bound traffic and there is an excess of east-bound traffic at certain times of the day, as for instance commuters' trains into a big city in the morning, it is highly desirable to operate east-bound trains over the normal west-bound track, but as under present conditions the automatic train protection provided on east-bound tracks is only operative and responsive to east-bound traffic and automatic train protection provided on west-bound tracks is only operative and responsive to west-bound traffic, this is impossible to do safely.

A principal object of this invention is to provide means to operate trains safely in both directions over a trackway or east-bound trains over a normal west-bound track or vice versa and at the same time provide complete automatic block train protection.

A further object of the invention is to provide means so that when the train protection is operative for allowing and protecting an east-bound movement for a certain length of track all west-bound train protection is inoperative or operative to indicate danger to west-bound trains and vice versa.

A further object of the invention is to provide means by which an electrical switch, the position of which determines the direction of traffic to be allowed for a particular track, is locked in the position in which it has been placed until all trains on the section governed by such switch have left the section, that is, when one or more blocks are set up through the medium of the switch to allow east-bound train movements, the particular section of track can not be changed to permit west-bound train movements until the block or blocks governed by the switch are unoccupied. The location of the locking means is such as to be visible to the operator and thereby give an indication whether the section of track is occupied by a train or not.

Other objects and advantages will appear as the description of the particular physical embodiment of the invention and desirable modifications thereof selected to illustrate the invention progresses and the novel features will be particularly pointed out in the appended claims.

In describing the invention in detail, reference will be had to the accompanying drawings, wherein I have illustrated a preferred physical embodiment of my invention, and wherein like characters of reference, designate corresponding parts throughout the several views and in which:

Figure 1 is a diagrammatic representation of apparatus and circuits along a track embodying my invention. Figures 2 and 3 are modifications of the system shown in Figure 1; Figure 4 shows a modification of Fig. 1 and also shows locking means to prevent an improper manipulation of the controlling switch; Fig. 5 shows apparatus and circuits on the vehicle carrying the train control means; Fig. 6 is a modification of Fig. 5.

Fig. 1 illustrates in full lines, a single trackway railway, although for the purposes of my invention it may well be, say, the normal east-bound track of a two track railway: therefore a normal west-bound track is shown in dotted lines, which track is not shown as being equipped with a train control system as it is only necessary to duplicate parts that are shown for the protection of the track considered the normal east-bound track.

The trackway shown in full lines in Fig. 1, is divided into sections or blocks A, B, C, D, and E. Each block is provided with a track battery 1 and a track relay 2 and with the track rails forms a normally closed track circuit well known to those skilled in the art. Rail 3 of the track is electrically continuous, while rail 4 of the track is divided into block sections by means of the insulating joints 5. Each track relay 2 controls two armatures 6 and 7. Alongside of the track are shown pairs of train control rails for each block, train control rails 8 and 9 governing east-bound movements into block C, and train control rails 10 and 11 governing west-bound movements into block C. Train control rails 8 and 11 are distant train control rails placed the proper braking distance in the rear of the entrance of block C; signal rails 9 and 10 are home train control rails placed along the track just previous to the entrance to block C. Similar train control rails are placed to govern east and west-bound movements of each block. Wire 12 electrically connects distant rail 8 and home rail 9 and wire 13 connects these rails to a front contact of armature 7 of track relay 2. Wire 14 electrically connects distant rail 11 and home rail 10 and wire 15 connects these rails with a front contact of armature 6 of track relay 2.

At a proper or desirable place, as a despatcher's office, interlocking tower or wayside station is located a manually operable switch 16. One side of this switch is connected through wire 17, battery 18, wire 19 to track rail 3. In one position of switch 16, it is electrically connected to line wire 20, while in the other position of switch 16 shown in dotted lines, it is connected to line wire 21. Line wire 20 is connected at each block section through wire 22 to armature 7 of track relay 2, and line wire 21 is connected at each block section through wire 23 to armature 6 of track relay 2.

Normally switch 16 governs a section of track consisting of one or more blocks between passing sidings or crossovers where a train can cross over from one track to the other.

The system so far described provides for energizing or deenergizing train control rails 8 and 9 when switch 16 is connected to line wire 20, and for energizing or deenergizing train control rails 10 and 11 when switch 16 is connected to line wire 21. The means by which train control may be effected on the locomotive by reason of the energization or deenergization of train control rails will be described hereinafter. The train control on the locomotive is so arranged that a proceed indication is given by a train control rail when the train control rail is energized, and a stop indication when the train control rail is deenergized.

The system of Fig. 1 operates as follows: When the track is intended to be used for east-bound train movements, switch 16 is in contact with line wire 20. Assuming that there is no train in any of the blocks governed by the switch, all the track relays 2 are energized and armatures 6 and 7 make contact with the wires leading to the train control rails. Train control rails 8 and 9 are energized and therefore conditioned to give a proceed to a train through the following circuit: track rail 3, wire 19, battery 18, wire 17, switch 16, wires 20 and 22, armature 7 and wires 13 and 12. In this position of switch 16, only the east-bound rails 8 and 9 can be energized, while the west-bound rails 10 and 11 remain deenergized, since these receive their energy through line wire 21 which is disconnected from battery 18 by switch 16.

When the section of track composing blocks A, B, C, D, and E is conditioned for east-bound train movements, automatic train protection is also provided; when, for instance, an east-bound train is in block C the track battery of block C is short circuited through the wheels and axles of the east-bound train. Track relay 2 of block C is not sufficiently energized to retain the armatures 6 and 7 so as to make contact with the front contacts of the track relay and these contacts are broken by the dropping of armatures 6 and 7. Armature 7, being disconnected from its front contact and wire 13, disconnects train control rails 8 and 9 of block B from line wire 20 and battery 18 so that a second train moving eastward in block B will get a danger signal at train control rails 8 and 9. When the first train has moved from block C into block D, armatures 6 and 7 in block C will be drawn upwardly and again close the front contacts, thus again energizing train control rails 8 and 9 of block B and conditioning them to give a proceed indication to a following train.

When the last east-bound train has left the section governed by switch 16 and it is desired to condition the section of track for west-bound movements, switch 16 is disconnected from line wire 20 and connected to line wire 21. This results in disconnecting all train control rails governing east-bound movements from battery 18, thus deenergizing all east-bound train control rails and conditioning them to give a danger or stop indication to all east-bound trains. At the same time all west-bound train control rails are conditioned to give a proceed indication but automatic train protection is provided for west-bound following movements; for instance, assuming a west-bound train in block C, track relay 2 of block C will be deenergized and armature 6 will be disconnected from front contact and wire 15, thus disconnecting rails 10 and 11 of block D from line wire 21 and battery 18 and so a following train will receive a stop indication before entering block C.

Figure 2 is a modification of Fig. 1, the track and train control rail layout being identical. The modification consists in introducing a polarized relay 25 at each block section. These polarized relays are controlled by a switch 16ᵃ through line wire 24 and wire 27. Switch 16ᵃ is a pole changing switch, that is, in one position positively energizing line wire 24 and in the other position negatively energizing line wire 24. When switch 16ᵃ is in the position as shown in Figure 2, current flows in a circuit as follows: from the positive side of battery 18ª, line wire 26, switch member 34, line wire 24, polarized relays 25, wire 27 to track rail 3, wire 19ª to the other switch member 33 and thence through wire 28 to the negative pole of battery 18ª. With the switch 16ª in this position polarized relays 25 are positively energized and their polarized armatures as 29, assume the positions shown in Figure 2. With the polarized armatures in these positions all west-bound train control rails are conditioned to receive energy from battery 18ª through circuits such as the following: positive side of battery 18ª, wire 26, switch member 34, line wire 24, wire 30, polarized armature 29, wire 31, track relay armature 6, wire 32 to train control rails 10 and 11 and from these rails through a circuit on the locomotive to track rail 3, thence through track wire 19ª, switch member 33 and wire 28 to the negative side of the battery.

When switch 16ª is placed in the position opposite to that shown in Fig. 2, polarized relays 25 are negatively energized through the following circuit: from the negative side of battery 18ª, wire 28, switch member 34, line wire 24, polarized relays 25, wire 27 to track rail 3 and thence through wire 19ª, switch member 33, and wire 35 to positive side of battery 18ª. When polarized relays 25 are thus negatively energized the polarized armatures of the relays will assume the position opposite to that shown in Fig. 2, whereby the west-bound train control rails are disconnected from battery 18ª and the east-bound train control rails are conditioned to receive energy from battery 18ª through circuits such as the following: from negative side of battery 18ª, wire 28, switch member 34, line wire 24, wire 30, polarized armature 29, wire 36, armature of track relay 7, wire 37, train control rails 8 and 9, and thence through a circuit on the locomotive to track rail 3, and wire 19ª, switch member 33, and wire 35, to positive side of battery 18ª.

When switch 16ª is positioned as last described all west-bound train control rails are deenergized, and therefore conditioned to give a stop indication, but all east-bound train control rails are conditioned to be energized and give a proceed indication as described in reference to Fig. 1. Automatic rear end protection from block to block is similarly provided by the arrangement of Fig. 2 but in tracing the circuits above described for the energization of the control rails the energization of the respective track relays was assumed.

Fig. 3, is a further modification of Fig. 1. In Figures 1 and 2, a single rail track circuit is shown, track rail 3 being electrically continuous, track rail 4 being divided into blocks through insulating joints 5. In Fig. 3 a double rail track circuit is provided, track rails 3 and 4 being divided into blocks by inserting insulating joints in both track rails 3 and 4. In order to provide a return circuit to battery 18ª which in Figures 1 and 2 is through track rail 3, a return wire 38 is provided which in turn is connected through resistance 39 to track rail 3 of each block section. The purpose of the resistance coils 39 is to prevent current from the track batteries of one block flowing into another block.

As distinguished from the systems shown in Figs. 1 and 2, the system illustrated in Fig. 3 contemplates that both east and west bound control rails shall be simultaneously energized, either positively or negatively, according to the position of the switch 16ª. Positive energy may be utilized to indicate proceed to an east bound train and stop to a west bound train, and, to continue the example, negative energy may be employed to indicate stop to the east bound train and proceed to the west bound train. It will be understood that with this arrangement, the engine man receives a real signal, and need not depend on the mere absence of a signal. Obviously, the absence of a real signal may be regarded as constituting still a third signal.

The circuits shown in Fig. 3 comprise a line wire 24 extending from one side of the battery 18ª along the track. A wire 31ª extends from the wire 24 adjacent each track relay 2 to both armatures 6 and 7 of the track relay. When the armatures 6 and 7 are attracted, current from the battery 18ª flows through them, respectively, to the west and east bound train control rails, thence through the cab circuit to the track rail 3 and back to the battery via wire 79, resistance 39, wire 80, and line wire 38. When a train is in a block both east and west bound rails protecting said block are deenergized, and a train in either adjacent block accordingly receives no electrically actuated signal, and hence information regarding an advance or approaching train may be transmitted.

The system as so far described is useful in conjunction with the cab circuit described and claimed in my prior Patent No. 1,239,048, patented September 4, 1917, and herein more schematically illustrated in Fig. 6, and hereinafter described.

Fig. 4 is a further modification of Fig. 1. In this modification fixed signals 40 are substituted for east-bound train control rails 8 and 9 and fixed signals 41 are substituted for west-bound train control rails 10 and 11. Signals 40 and 41 may be the signals themselves indicating clear when energized and danger when deenergized; or they may represent relays which condition fixed signals either to the clear or danger condition in the usual manner depending upon whether relays 40 and 41 are energized or energized positively or negatively or deenergized. In addition to the track layout similar to Fig. 1, Fig. 4, shows a locking arrangement 42. This locking arrangement is intended to prevent the throwing of switch 16 from one position to another as long as there is either an east-bound or a west-bound train in the section controlled by switch 16. This is accomplished in the following manner: Attached to switch 16 is a slidable bar 43; this bar is notched as at 44 and 45, so that when the switch is in the position shown, notch 45 is in alignment with dog 42 connected with armature 46 of magnet 47; also when switch 16 is in the opposite position to the one shown in Fig. 4, notch 44 of bar 43 is aligned with dog 42.

Whenever a train enters the section of track governed by switch 16, magnet 47 becomes energized, thus locking bar 43 in the position it is in through the following circuit: battery 18, wire 48, magnet 47, line wire 49, wire 50, back contact of armature 6, wire 51, line wire 20, switch 16, to the opposite side of battery 18. Similarly when any other track relay of the blocks governed by switch 16 is deenergized, switch 16 is locked in the position it is then in. When switch 16 is in the right hand position, locking is effected in a similar manner, the dog 42 engaging the notch 44, instead of the notch 43. The circuit for engaging magnet 47 is the same as that just described, except that the wire 50 leads to a back contact for the armature 7, thence to wire 51[a], line wire 21, and so to the battery 18. It is thus evident that a section of track governed by switch 16 cannot be changed from an east-bound condition into a west-bound condition until all the trains have left the section so governed. The location of the locking means is such as to be visible to the operator and thereby give an indication as to whether the section of track is occupied by a train or not.

It is evident that this locking arrangement of switch 16 is applicable to all the layouts shown in Figs. 1, 2 and 3 and it is to be considered a part thereof without the addition of further figures.

In Figures 5 and 6, I have shown suitable train carried apparatus to co-operate with my trackway circuits and apparatus. The arrangement as shown by Fig. 5, can be used with the arrangements as shown by Figures 1 and 2, and the arrangement of Fig. 6 is especially designed for co-operation with a trackway as shown in Fig. 3.

In Fig. 5, the rails are designated by the numerals 3 and 4 and a car, represented solely by a pair of wheels and an axle, the wheels being designated 52 and the axle 53, is shown resting upon the rails 3 and 4. The car carries thereon an electro-magnetic device 54, a train control device 55, another train control device 56, and a shoe 57 pivoted at 58.

As the car travels along the rails, the shoe 57 contacts with the several train control rails as 8, having inclined end portions, and in so contacting is turned on its pivot as shown in Fig. 5. If the rail 8 is energized when the shoe 57 contacts therewith, having reference both to Fig. 1, and Fig. 5, current will flow through the wire 59, electro-magnetic device 54, wires 60, 61, 62 and 63 to the axle 53, then through the wheel 52 and rail 3 to the wire 19, and so back to the other terminal of the trackside battery 18. The current flowing in the above traced path, will energize the electro-magnetic device 54, and raise its armature 64 into the position as shown in Fig. 5. The electro-magnetic device 54 may be a neutral relay or other circuit closing device operating without regard to the polarity of the current flowing through wires 59 and 60. As the train proceeds and the shoe 57 rides over the control rail 8, it will gradually turn on its pivot 58, following the incline of the control rail, and before the shoe actually gets out of contact with the control rail, one arm of the shoe will contact with the wire 65, whereupon a circuit will be formed in which current will flow as follows: one terminal of battery 67, wire 66, armature 64, wire 65, shoe 57, wire 59, electro-magnetic device 54, and wires 60, 61 and 68 to the other terminal of the battery 67. The current flowing in the above traced path will maintain the energization of the electro-magnetic device 54, and so cause its armature 64, to be maintained in its upper position as shown in Fig. 5, after the shoe 57 leaves the control rail as 8, and until the next control rail is encountered.

When armature 64 is in the upper position as shown, a circuit is formed in which current flows as follows: one terminal of battery 67, wire 66, armature 64, wire 69, train control device 55, here illustrated as a lamp, and wires 70, 71 and 68 to the other terminal of the battery 67. Current flowing in the above traced path will energize the train control device 55 indicating to the motorman or engine driver that it is proper for him to proceed.

If a train equipped with the devices as shown in Fig. 5, in passing along the trackway, encounters a rail as 8, which is not energized, then upon the movement of the shoe 57, by contact with the rail, the circuit hereinbefore traced through the wire 65 will be broken, and as there is no energization of the rail 8, the circuit hereinbefore traced through the wire 59 will not be made; consequently the electro-magnetic device 54 will be deenergized and will remain deenergized even after the shoe 57 leaves the rail 8, because, although in passing down the incline of the rail, one arm of the shoe will contact with wire 65, before the shoe actually leaves the rail, nevertheless the circuit through wire 65 will not be completed because at that time, the armature 64 will be in the lower position out of contact with wire 65; consequently the train will have to proceed, if it proceeds at all, with armature 64 in its lower position. When armature 64 is in its lower position, a circuit is formed in which current flows as follows: one terminal of the battery 67, wire 66, armature 64, wire 71, train control device 56, here shown as a lamp, and wires 72, 62 and 68 to the other terminal of the battery 67. Current flowing in the above traced path, will energize the train control device 56, and indicate to a motorman or engine driver, that the train should not proceed. It should also be observed that under the conditions as just outlined the circuit through train control device 55 is broken, with a consequent deenergization of train control device 55, so that the train control device 55, which is here illustrated as a lamp, will go out, and the going out of this lamp, will also be a notification or an action necessitating the stopping of the train.

I have called the devices 55 and 56, train control devices, because these devices are merely illustrative of one of the many and various means which may be controlled by the electro-magnetic device 54, and by illustrating the devices 55 and 56, as lamps, I do not desire to be understood as excluding such devices as electro-pneumatic air valves connected with the ordinary and well-known air-brake system of a train, and operating when energized or deenergized to automatically control the setting or releasing of the air-brakes.

I further wish to have it observed, that contact with a train control rail, such as 8, is merely to cause such action or notification upon the vehicle as will cause that vehicle to stop or be brought to a stop at the time of or prior to the passage of the tran, past the next following train control rail, such as 9.

In Fig. 6, I have illustrated a construction particularly applicable to the trackway arrangement as shown in Fig. 3.

In Figs. 6, 3 and 4 designate track-rails, 52 designates wheels, 53 designates an axle, and 57 a shoe, adapted to a contact with a train control rail as 8.

By reference to the description hereinbefore given of the construction as shown by Fig. 3, it will be learned that any train control rail used in such system, such for example as a rail 8, may be positively energized, negatively energized or deenergized. If rail 8 is positively energized, then current will flow in a circuit as follows: rail 8, shoe 57, wire 73, electro-magnetic device 74, wires 75, 76, 77 and 78, axle 53, wheel 52, rail 3, wire 79, resistance 39, wire 80, and wire 38 to the pole changing switch 16[a]. Current flowing in the above traced path, so energizes electro-magnetic device 74, that neutral armature 81 is moved to the upper position as shown in Fig. 6, and its polarized armatures 85 and 86 are thrown to the left as shown in Fig. 6.

As the train advances and shoe 57 rides down the incline of the train control rail, one arm of the shoe contacts with wire 88, so that while armature 81 is in the upper position as shown, and before the shoe 57 leaves the rail 8, a circuit is formed in which current flows as follows: positive terminal of the battery 89, wires 90 and 91, switch arm 83, wire 92, armature 81, wire 88, shoe 57, wire 73, electro-magnetic device 74, wires 75 and 93, switch arm 84, and wires 94 and 95 to the negative terminal of the battery 89.

Current flowing in the above traced path maintains the energization of electro-magnetic device 74 after the shoe 57 has left the rail 8, and until the shoe 57 contacts the succeeding train control rail such as 9. The current flowing in the last traced circuit, flows in such direction as to maintain the energization of electro-magnetic device 74, and to maintain that energization such that the polarized armatures 85 and 86 are held in the position as shown in Fig. 6, so that the train control device 96, is energized by current flowing in a circuit as follows: positive terminal of battery 89, wires 90 and 91, switch arm 83, wire 92, armature 81, wire 97, switch arm 82, wire 98, polarized armature 86, wires 99 and 100, train control device 96, wires 101, 76 and 93, switch arm 84, and wires 94 and 95 to the negative terminal of the battery 89. Current flowing in the above traced path energizes the train control device 96, illustrated as a lamp, and maintains the energization of the lamp 96 until the shoe 57 contacts with another train control rail 8, so that the motorman or engine driver, is notified that he may proceed.

When the switch 16[a] is in the reverse position, that is, when the upper arm of the switch is connected to the positive side of the battery, the control rails will be negatively energized. Current will now flow to the rails 8, 9, 10 and 11 via resistance 39, rail 3, cab circuit, to rail 8, armature 7, wire 38, upper arm of switch 16[a] and so to the negative terminal of battery 18[a]. The current in the cab circuit will now flow in via rail 3, wheel 52, axle 53, wires 77, 76, 75, magnet 74, wire 73, and out through control rail 8; i. e., in a reverse direction, through magnet 74 with respect to the case previously described. When so energized, with current flowing in from wire 75, the polarized armatures 86 and 85 will be attracted to the right, or to the position opposite to that illustrated.

As the armatures 85 and 86 are thrown to the right as viewed in Fig. 6, the circuit energizing train control device 96 will be broken, since armature 86 will break contact with wire 99, and although armature 85 contacts with wire 104, wire 110 does not engage switch arm 82; consequently the train control device 96 will no longer be energized. At the same time stop train control device 106 will be energized by a circuit in which current flows as follows: positive terminal of battery 89, wires 90 and 91, switch arm 83, wire 92, armature 81, wire 97, switch arm 82, wire 98, armature 86 in the right hand position, wires 111 and 108, train control device 106, wires 109, 77, 76 and 93, switch arm 84 and wires 94 and 95 to the negative terminal of battery 89.

As shoe 57 leaves rail 8, the circuit for electro-magnetic device 74 will not be maintained, because as shoe 57 rides down the slope of the rail, it will arrive at a point where, while still in contact with the rail, one arm will also be in contact with wire 88. Under such condition, with rail 8 negatively energized as assumed, the battery on the trackway as 18[a], will be connected in opposition to the battery 89 on the train, that is, the positive terminal of the battery on the trackway will be connected to a rail as 3, and so by wheel 52, axle 53, wires 78, 77, 76 and 93, switch arm 84, and wires 94 and 95 to the negative terminal of battery 89, and the negative terminal of the trackway battery will be connected to rail 8 and then by shoe 57, wire 88, armature 81, wire 92, switch arm 83 and wires 91 and 90 to the positive terminal of battery 89. These two batteries acting in opposition will result in such a combined action upon the electro-magnetic device 74, that it will be deenergized, and armature 81 dropped to its lower position.

When armature 81 drops to its lower position, train control device 96 remains deenergized, because its circuit includes raised armature 81 as hereinbefore traced, and at the same time, train control device 106 is continued energized through a circuit in which current flows as follows: positive terminal of battery 89, wires 90 and 91, switch arm 83, wire 92, armature 81 in the lower position, wires 107 and 108, train control device 106, wires 109, 77, 76 and 93, switch arm 84, and wires 94 and 95 to the negative terminal of battery 89. The energization of train control device 106 results in a stop indication for the vehicle and this is reenforced by the absence of the proceed indication which may be given by train control device 96.

The deenergization of electro-magnetic device 74 caused by the vehicle having encountered a negatively energized rail will continue until the next rail along the trackway is encountered, whereupon electro-magnetic device 74 will be affected in accordance with the condition of that rail.

Regardless of whether a train equipped as shown in Fig. 6, is moving east-bound or west-bound, upon the lower trackway as shown in Fig. 3, if its shoe 57 encounters a train control rail as 8 or 11, which, from any cause whatever, has become deenergized, the maintaining circuit to electro-magnetic device 74 will be broken, and neutral armature 81 will fall to its lower position, and under such conditions train control device 96 will be deenergized regardless of the positions of polarized armatures 85 and 86, because by reference to the description hereinbefore set forth, of the two circuits for energizing train control device 96, it will be found that both of them include armature 81 in its upper position; consequently with the armature 81 in its lower position, both of these circuits will be broken, and train control device 96 will be deenergized.

If the positions of the arms 84, 83 and 82 be reversed from those shown in Figure 6, that is to say if said switch arms be thrown to the right, a negatively energized control rail will cause the operation of device 96 to give a proceed indication and a positively energized control rail will cause the operation of device 106 to give a stop indication. Since the effects of such reversal in point of circuit changes are fully explained in my said Patent No. 1,239,048 and will also be obvious from the previous explanation of the relations and operations of the circuit parts it is deemed unnecessary to trace the altered circuits in detail. It may here be noted that the switch arms 82, 83 and 84 are positioned in accordance with the direction of travel in the train, having one operative position for east bound movement, and the alternate operative position for west bound movement.

From the above description of Figure 6 in connection with Figure 3, it will be understood that if the train control rails are positively energized, trains having their cab switches in the left hand position as shown in Figure 6 will receive proceed indications and trains having their cab switches in the hight hand positions will receive stop indications, the assumption being that the trains so receiving proceed indications are east bound and the trains so receiving the stop indications are west bound; that if the train control rails are negatively energized trains having their cab switches in the right hand positions will receive proceed indications and trains having their cab switches in the left hand positions will receive stop indications, the assumption being that the trains so receiving proceed indications are west bound and the trains so receiving the stop indications are east bound; and that if the train control rails be deenergized, as by the block ahead being occupied or from any other cause, a vehicle, regardless of whether running east bound or west bound, will receive a stop indication.

Although train control devices 96 and 106 are described as lamps, I desire to have it understood that I do not wish to exclude such other devices as may be usable in this connection, such as were described in connection with the description of train control devices 55 and 56 shown in Fig. 5.

I further desire to have it understood that the stop and proceed indications given on the vehicle are not necessarily limited to a visual indication, and I do not desire to exclude devices for giving stop and proceed indications, which act directly upon any part of the vehicle or its equipment, as for instance the airbrakes or the propulsion means, and I desire to further have it understood that the deenergization of 96 is as much a danger or stop indication as the energization of 106 is a danger or stop indication.

By reference to my Patents No. 941,541 granted Nov. 30, 1909, and No. 1,239,048 granted September 4, 1917, it will be found that the principles of Figs. 5 and 6 are fully disclosed therein.

Although I have described the principle and mode of operation of my invention, and illustrated and described a preferred physical embodiment thereof, and desirable modifications thereof, nevertheless I desire to have it understood that the forms selected are merely illustrative, and do not exhaust the possible physical embodiment of means underlying my invention.

Having fully described my invention, I claim:

1. In a railway train control system, in combination: a trackway comprising a pair of parallel rails, one of which is electrically discontinuous; a train control rail arranged on one side of the trackway; a source of current; manually operable means located at a fixed remote point and in circuit with said source for connecting one terminal of the source to the train control rail; means including a track battery and a track relay in permanent relation to one another and connected between said parallel rails and controlled by the presence of a train upon the trackway for controlling the operative circuit established by the last mentioned means, and means controlled by a train upon the trackway and having an operating circuit supplied from said source and which includes said manually operable means for locking the manually operable means in its operated position.

2. In a railway train control system, in combination: a trackway, including two rails; means for dividing the trackway into electrically isolated sections; a source of a difference of potential connected across the rails at one point in each section; a translating device connected across the rails of each section at a point remote from the connection of the source of a difference of potential, said source and said translating device being in permanent relation to one another; a train control rail positioned on one side of the trackway; a train control rail positioned on the other side of the trackway; a source of current; manually operable means located at a fixed remote point and in circuit with said source for connecting one terminal of the source to either of the train control rails; means controlled by said translating device for controlling the last mentioned means, and means for connecting the train control rail to the other terminal of the source of current.

3. In a railway train control system, in combination: a trackway; train control means arranged on each side of the trackway, that upon one side for governing trains moving in one direction, and that upon the other side for governing trains moving in the opposite direction; a source of electrical energy for the operation of said train control means; manually operable means located at a fixed remote point and in circuit with said source for conditioning the train control means on one side of the trackway for transmitting a proceed indication to trains going in one direction and simultaneously conditioning the train control means on the other side of the trackway to transmit a stop indication; and means having its elements in permanent relation and having its condition controlled by a train upon the trackway for governing the manually operable means in such a manner that the first train control means positioned back of a train on the trackway will transit a stop indication to a following train.

4. In a railway train control system, in combination: a trackway; a train control rail arranged on one side of the trackway; a train control rail arranged on the other side of the trackway arranged in staggered relation to the first mentioned train control rail; a source of current; manually operated means located at a central point for connecting one terminal of the source to either the one or the other train control rail; means including a track battery and a track relay in permanent relation to one another and controlled by the presence of a train upon the trackway for controlling the operative circuit established by the last mentioned means, and means including a train having an electrical circuit thereon for connecting the train control rails to the other terminal of the source of current.

5. In a railway train control system, in combination: a trackway including two rails; means for dividing the trackway into electrically isolated sections; a source of a difference of potential connected across the rails at one point in each section; a translating device connected across the rails of each section at a point remote from the the connection of the source of a difference of potential; a train control rail on one side of the trackway; a train control rail on the other side of the trackway, each rail being arranged adjacent the means for dividing the trackway into electrically isolated sections, and one rail being on the opposite side thereof from the other rail; a source of current; two line wires; manually operated means for connecting either the one or the other of the line wires to one terminal of the source of current; means controlled by the translating devices for connecting or disconnecting the train control rail on one side of the trackway with respect to one line wire, and for connecting or disconnecting the train rail on the other side of the trackway with respect to the other line wire, and means including a car movable upon the trackway rails and carrying a train control circuit and devices for electrically connecting each of the train control rails to the other terminal of the source of current.

6. In a railway train control system, in combination: a trackway including two rails; means for dividing the trackway into electrically isolated sections; a source of a difference of potential connected across the rails at one end of each section; a translating device connected across the rails of each section at the opposite end thereof; train control rails, two arranged in tandem on one side of the track rails, and two arranged in tandem on the other side of the track rails adjacent each means for separating the rails into electrically isolated sections; an electrical conductor connecting the two train control rails on one side of the track rails, and an electrical conductor connecting the two train control rails on the other side of the trackway; a source of current; a conductor connecting one side of the source with one of the track rails; a manually operable switch arm connected to the other side of the source; two lines wires, each having a terminal cooperating with the switch arm; an electrical conductor connecting the train control rails on one side of the track rails with one of the line wires; an electrical conductor connecting the other line with the train control rails on the other side of the track rails, and means interposed in the last mentioned conductors, for rendering them continuous or discontinuous and controlled by the translating devices.

7. In a railway train control system, in combination: a trackway including two rails; means for dividing the trackway into electrically isolated sections; a source of a difference of potential connected across the rails at one end of each section, a translating device connected across the rails of each section at the opposite end thereof; train control rails, two arranged in tandem on one side of the track rails and two arranged in tandem on the other side of the track rails adjacent each means for separating the rails into electrically isolated sections; an electrical conductor connecting the two train control rails on one side of the track rails; an electrical conductor connecting the two train control rails on the other side of the trackway; a source of current; a conductor connecting one side of the source with one of the track rails; a manually operable switch arm connected to the other side of the source; two line wires, each having a terminal cooperating with the switch arm; an electrical conductor connecting the train control rails on one side of the trackway with one of the line wires; an electrical conductor connecting the other line with the train control rails on the other side of the track rails; an electro-magnetic device; a connection from one terminal of the electro-magnetic device to the terminal of the battery connected to the track rail; a line wire connected to the other terminal of the electrical magnetic device; a reciprocable bar formed with two notches therein connected to the switch arm; a dog formed to fit into either the one or the other of the notches and so positioned that when the switch arm is in one position the dog may be fitted in one notch, and when the switch arm is in its other position, the dog may fit in its other notch; means controlled by the electro-magnetic device when energized for causing the dog to move into one or the other of the notches, according to the position of the switch arm, and to thus prevent movement of the switch arm manually until deenergization of the electro-magnetic device; a conductor connected to the line wire last mentioned, and means controlled by the translating device to connect said conductor with either the one or the other of the two first mentioned line wires, whereby irrespective of the position of the manually operative switch, the electro-magnetic device will be energized upon the entrance of a train to the track section to which the translating device is connected.

8. In a railway train control system, in combination: a trackway having a pair of parallel rails, one of which is electrically discontinuous; a track relay and a track battery in permanent relation to one another and to said trackway said track relay and track battery each being connected between said parallel rails; train control means adjacent the trackway for one direction of traffic; train control means adjacent the trackway for the opposite direction of traffic; a source of electrical energy for the operation of said train control means; operating circuits between and including said source and means and taken through an armature of said track relay and manually operated means located at a fixed remote point and in said operating circuits for selecting the direction of train movement in which a proceed indication shall be given and for transmitting a proceed indication to the train control means for one direction of traffic and for simultaneously conditioning the other train control means to transmit a stop indication.

9. In a railway train control system, in combination: a trackway having a pair of parallel rails, one of which is electrically discontinuous; a track relay and a track battery in permanent relation to one another and to said trackway said track relay and track battery each being connected between said parallel rails; train control electrical energy transmitting means adjacent the trackway for one direction of traffic; train control electrical energy transmitting means adjacent the trackway for the opposite direction of traffic; a source of electrical energy for the operation of said train control electrical energy transmitting means; operating circuits between and including said source and means and taken through an armature of said track relay; a vehicle for cooperation with said train control electrical energy transmitting means; and manually operated means located at a fixed remote point and in said operating circuits for selecting the direction of train movement in which a proceed indication shall be given and for transmitting a proceed indication to the train control means for one direction of traffic and for simultaneously conditioning the other train control means to transmit a stop indication.

10. In a railway train control system, in combination; a trackway; means for train control adjacent the trackway for one direction of traffic; means for train control adjacent the trackway for the opposite direction of traffic; a source of current; a unitary means located at a fixed remote point and in circuit with said source for connecting one terminal of the source to either the one or the other train control means; means including a track circuit and a track relay in permanent relation to one another and to the trackway and controlled by the presence of a train upon the trackway for controlling the last mentioned means, and means for connecting the train control means to the other terminal of the source of current.

11. In a railway train control system, in combination: a trackway, a track relay; and a track battery; said trackway carrying only the current from said battery; train control means adjacent the trackway for one direction of traffic; train control means adjacent the trackway for the opposite direction of traffic; a source of electrical energy for the operation of said train control means; operating circuits between and including said source and means and taken through said track relay; manually operated means located at a fixed remote point and in said operating circuits for selecting the direction of train movement in which a proceed indication shall be given and for transmitting a proceed indication to the train control means for one direction of traffic and for simultaneously conditioning the other train control means to transmit a stop indication; and means controlled by a train upon the trackway and having an operating circuit supplied from said source for locking the manually operative means in its operated position for conditioning said control means.

12. In a railway train control system, in combination: a trackway; means for train control adjacent the trackway for one direction of traffic; means for train control adjacent the trackway for the opposite direction of traffic; a source of current; manually operated means located at a fixed remote point and in circuit with said source for connecting one terminal of the source to either one or the other train control means; means including a track circuit and a track relay in permanent relation to one another and to the trackway and controlled by the presence of a train upon the trackway for controlling the last mentioned means; means for connecting the train control means to the other terminal of the source of current; and means controlled by a train upon the trackway and having an operating circuit supplied from said source for locking the manually operated means in its operated position.

13. In a train control system, a track section over which trains move in either direction, a train, train control means adjacent the trackway for directing train movements in either direction, signals on the train responsive to the electrical condition of said train control means, a track circuit comprising a track relay and a source of current therefor, each of which is connected between the rails of the trackway for controlling the train control means for a following train moving in one direction, and manual means comprising a switch located at a central point for controlling the train control means for trains moving in the opposite direction.

14. In a train control system, a single track divided into blocks over which trains move in either direction, signal controlling means for each direction of train movement disposed adjacent each block, a central station, a line circuit from the central station for operating the signal controlling means for all of said blocks, a source of current for the line circuit, a unitary switch at said central office for connecting said current source to said line circuit and said signal controlling means, a track relay and a track battery for each block, branch circuits extending from each signal controlling means to said line circuit through armatures of the track relay of an adjacent block whereby said branch circuits and said signal controlling means may be energized only when the track relay of a preceding block is closed.

15. In a train control system, a trackway divided into blocks over which trains operate in either direction, a track relay for each block provided with a plurality of armatures, a central office, a line circuit, a line battery, a switch at the central office for connecting the line battery to the line circuit, signal operating means for displaying signals for either direction of train movement, a branch circuit extending from the signal operating means for one direction of operation through a track relay armature to said line circuit, a branch circuit extending from a signal operating means for the other direction of operation through a track relay armature to said line circuit, said branch circuits extending through track relay armatures of preceding blocks, said branch circuits for one direction of operation being conditioned to display a proceed signal when said central office switch assumes one position, and said branch circuits for the opposite direction being conditioned to display a stop signal when said central office switch is in said position.

16. In a train control system, a trackway divided into blocks over which trains operate in either direction, a track relay for each block provided with a plurality of armatures, a central office, a line circuit, a source of current capable of producing different effects, a switch at the central office for connecting said source to the line circuit, signal operating means for displaying signals for either direction of train movement, a branch circuit extending from a signal operating means for one direction of train movement through an armature of the track relay of a preceding block to said line circuit, a branch circuit extending from a signal operating means for the other direction of train movement through an armature of the track relay of its preceding block to said line circuit, said branch circuits and signal controlling means being conditioned to display a proceed signal for one direction of operation and a stop signal for the other direction of operation in accordance with the effect of the current selected at said central office through said switch, said proceed signal being rendered ineffective when a train is in a preceding block.

17. In a train control system, a trackway divided into blocks over which trains operate in either direction, a track relay for each block provided with a plurality of armatures, a central office, a line circuit, a source of current, a switch at the central office for connecting the source of current to the line circuit, signal operating means for displaying signals for either direction of train movement, a branch circuit extending from the signal operating means for one direction of train movement to said line circuit, a branch circuit extending from the signal operating means for the other direction of train movement to said line circuit, said branch circuits extending through track relay armatures of preceding blocks, said branch circuits being conditioned to display a proceed signal for one direction of operation and a stop signal for the other direction of operation upon the positioning of said central office switch, and a locking circuit including a portion of said line circuit and said switch for preventing the change of a signal displayed after its acceptance by a train.

18. In a train control system, a single track divided into blocks over which trains move in either direction, a train, train control means adjacent the trackway for directing train movements in either direction, signals on the train responsive to the electrical condition of said train control means, a track circuit comprising a track relay and a source of current therefor each of which is connected between the rails of the trackway for controlling the train control means for a following train, a central office, a source of current, a line circuit, a manually operated switch at the central office for connecting the source of current to the line circuit, and branch circuits extending from the line circuit through the armature of the track relay for a preceding block for transmitting current to said train control means.

In testimony whereof I affix my signature.

PAUL J. SIMMEN.